United States Patent Office 2,966,603
Patented Dec. 27, 1960

2,966,603

CATHODE RAY TUBES

Rinaldo E. De Cola, Park Ridge, and Albert F. Augustine, River Grove, Ill., assignors to Admiral Corporation, Chicago, Ill., a corporation of Delaware No Drawing. Filed Oct. 11, 1954, Ser. No. 461,654

4 Claims. (Cl. 313—92)

The present invention relates to cathode ray tubes and more particularly light emitting screens for cathode ray tubes.

In the past, it has been customary to employ color filters having different hues of desired saturation to control the spectral distribution curve of the light passing through the filter to the observer. This method of approach uses a dyed plastic filter which is applied to the cathode ray tube screen or mounted separately in such a way as to interpose the filter between the screen and the observer. All effective color filters reduce the brightness of the screen 76% and above according to test measurements, as viewed by the observer, therefore, the efficiency of cathode ray tube is decreased with increased color saturation of the filter and/or effectiveness of the filter in attaining the desired spectral distribution curve of light.

An object of the present invention is to increase the efficiency of a cathode ray tube screen by producing light energy predominantly in that portion of the spectrum to which the human eye has the highest response to brightness and contrast.

Another object of the invention is the provision of a cathode ray tube screen for reproducing light images which reduces the eye fatigue of the observer while increasing the efficiency by producing light having a greater brightness response to the human eye.

A further object of the invention is to provide a cathode ray tube screen for reproducing light images efficiently and having improved contrast and reduced eye fatigue to the observer.

Still another object of the present invention is to increase the brightness response of the human eye to a given electronic excitation of the screen of a cathode ray tube and producing light images within a range of wave lengths having improved contrast and less eye fatigue.

The tube described herein is generally of the type having a screen composed of luminescent materials. The luminescent material suitable for these purposes are phosphors which emit light subsequent to the termination of actual electronic excitation or are phosphorescent.

Excitation of the phosphor on the screen of the cathode ray tube may be by direct electron impact or by the absorption of light wherein the latter is generally associated with a multilayer phosphor on the screen and the electrons emit radiant power. Heat is absorbed by the layer in contact with the inner surface of the tube face. The layers are defined by the size of the phosphor crystals and the inner layer comprises the larger crystals which emit the light seen by the observer.

The phosphors employed herein are ZnS mixed with ZnCdS and activators. The phosphors and activators are combined to form a mixture, and are then applied to the inner surface of the tube face, thereby defining a single layer of luminescent material. Silver activated phosphors have been found to be highly satisfactory. With a combination of phosphors having a low proportion of ZnS and a high proportion of ZnCdS, approximately 40% ZnS and 60% ZnCdS, the screen will be sepia in color or a brown or a yellowish red-yellow hue of low saturation. An alternative mixture of phosphors ZnS and CdS employing approximately 45% ZnS and 55% CdS may be used to obtain predominance in the desired wave length.

The predominant spectral distribution of light energy of the phosphor mixture may be located on ICI Chromaticity Diagram in the approximate range of light wave lengths from 570 to 600 millimicrons or within the area included by the hypothetical primaries ($X=.32$, $Y=.32$ and $.36$), ($X=.46$, $Y=.48$) and ($X=.58$, $Y=.35$) depending on relative spectral distribution of light energy in that area. The light may vary in hue as defined approximately by the light wave lengths and vary in saturation as defined approximately by the hypothetical primary X.

The human eye has a fixed selectivity and variable sensitivity characteristic responding to light having a wave length range from 400 to 700 millimicrons. The brightness sensation or variable sensitivity is at a maximum (100%) according to the standard luminosity curve (CIE) at approximate 560 millimicrons and remains above 70% up to 600 millimicrons. Since the human eye's brightness response is not uniform the combination of the ZnS phosphor and a high proportion ZnCdS phosphor direct the dominant wave lengths of light between 575 and 600 millimicrons to obtain maximum brightness for the human eye and also to render minimum eye fatigue and better contrast characteristic of these wave lengths of light.

As pointed out supra the blue component of radiation, for long time observation contributes substantially to the fatigue of the observer requiring filters even though the blue component produces the least brightness response for the human eye. The sepia color screen used with the cathode ray tube improves the ease of seeing a pattern even when the tube is used in the presence of high ambient illumination while maintaining maximum brightness and contrast. Also, the sepia color produced by the screen in the present invention preserves, to a greater extent, the dark adaptation of the human eye eliminating temporary blindness when looking from the screen to make other observations, due to the longer wave lengths of the dominant sepia hue.

Various modifications are contemplated and may obviously be resorted to by those skilled in the art without departing from the spirit and scope of the invention, as hereinafter defined by the appended claims, as only a preferred embodiment thereof has been disclosed.

We claim:

1. In a cathode ray tube, a luminescent screen for reproducing a light image comprising a single layer of intermixed luminescent material composed of a combination of approximately 40% ZnS and 60% ZnCdS phosphors and an activator, said phosphors producing a spectral distribution of light energy predominantly within the range of wave lengths from 570 to 600 millimicrons, sepia in hue of low saturation upon electronic excitation.

2. In a cathode ray tube, a luminescent screen for reproducing a light image comprising a single layer of intermixed luminescent material composed of a combination of 45% ZnS and 55% CdS phosphors and an activator, said phosphors producing a spectral distribution of light energy predominantly within the range of wave lengths from 570 to 600 millimicrons, sepia in hue of low saturation upon electronic excitation.

3. In a cathode ray tube, means for increasing the brightness and contrast response of images to the human eye, comprising a screen on the flattened front surface of said tube composed of a single layer of intermixed luminescent material of approximately 40% ZnS and 60% ZnCdS luminescent phosphors to produce light predominantly in the range of wave lengths from 570 to 600 millimicrons upon electronic excitation, said light being sepia in hue of low saturation.

4. In a cathode ray tube, means for increasing the brightness and contrast response of images to the human eye, comprising a screen on the flattened front surface of said tube composed of a single layer of intermixed luminescent material of approximately 45% ZnS and 55% CdS luminescent phosphors to produce light predominantly in the range of wave lengths from 570 to 600 millimicrons upon electronic excitation, said light being sepia in hue of low saturation.

References Cited in the file of this patent

UNITED STATES PATENTS

| | | |
|---|---|---|
| 2,158,640 | Strange et al. | May 16, 1939 |
| 2,352,035 | Strubig et al. | June 20, 1944 |
| 2,378,875 | Vansant | June 19, 1945 |
| 2,452,522 | Leverenz | Oct. 26, 1948 |
| 2,452,523 | Leverenz | Oct. 26, 1948 |